(12) United States Patent
Rose et al.

(10) Patent No.: US 8,213,607 B2
(45) Date of Patent: Jul. 3, 2012

(54) METHOD FOR SECURELY EXTENDING KEY STREAM TO ENCRYPT HIGH-ENTROPY DATA

(75) Inventors: Gregory G. Rose, San Diego, CA (US); Philip M. Hawkes, Ashfield (AU)

(73) Assignee: QUALCOMM Incorporated, San Diego, CA (US)

( * ) Notice: Subject to any disclaimer, the term of this patent is extended or adjusted under 35 U.S.C. 154(b) by 1050 days.

(21) Appl. No.: 11/550,779

(22) Filed: Oct. 18, 2006

(65) Prior Publication Data

US 2008/0095370 A1    Apr. 24, 2008

(51) Int. Cl.
*H04L 9/22* (2006.01)
*H04L 9/26* (2006.01)

(52) U.S. Cl. ............. 380/44; 380/46; 380/37; 380/278; 380/268; 713/168; 713/171; 708/250

(58) Field of Classification Search ............ 380/44, 380/46, 278, 37, 259, 268; 708/250; 713/168, 713/171
See application file for complete search history.

(56) References Cited

U.S. PATENT DOCUMENTS

| | | | |
|---|---|---|---|
| 5,511,123 A * | 4/1996 | Adams | 380/29 |
| 5,864,491 A | 1/1999 | Smeets | |
| 6,014,445 A * | 1/2000 | Kohda et al. | 380/28 |
| 6,088,800 A * | 7/2000 | Jones et al. | 713/189 |
| 6,415,032 B1 * | 7/2002 | Doland | 380/255 |
| 6,490,357 B1 | 12/2002 | Rose | |
| 6,769,063 B1 * | 7/2004 | Kanda et al. | 713/193 |
| 7,043,017 B2 * | 5/2006 | Swindlehurst et al. | 380/29 |
| 7,711,955 B1 * | 5/2010 | Olson et al. | 713/168 |
| 2002/0191784 A1 * | 12/2002 | Yup et al. | 380/37 |
| 2003/0055894 A1 * | 3/2003 | Yeager et al. | 709/204 |
| 2006/0002550 A1 | 1/2006 | Campagna et al. | |
| 2006/0059343 A1 * | 3/2006 | Berzanskis et al. | 713/171 |
| 2007/0005901 A1 * | 1/2007 | Kellar | 711/137 |

FOREIGN PATENT DOCUMENTS

WO    03003648    1/2003

OTHER PUBLICATIONS

Wei Chen, ZhengFu Han, XiaoFan Mo, FangXing Xu, Guo Wei and GuangCan Guo, Active phase compensation of quantum key distribution system, May 2008, Chinese Science Bulletin, Chinese Science Bulletin , pp. 1310-1314.*

(Continued)

*Primary Examiner* — Taghi Arani
*Assistant Examiner* — Amir Mehrmanesh
(74) *Attorney, Agent, or Firm* — Won Tae Kim (57) ABSTRACT

A stream stretcher is provided for securely expanding a key stream to match the length of a data block to be encrypted and/or decrypted. A key stream is obtained having a length of $L_Z$ bits. A length $L_D$ corresponding to a data block to be encrypted/decrypted is obtained, where $L_D > L_Z$. $L_D - L_Z$ new bits are recursively generated by combining at least two bits of the key stream. The $L_D - L_Z$ new bits are appended to the key stream to generate a stretched key stream. The data block may then be encrypted/decrypted with the stretched key stream. The at least two bits are selected to have offsets that form a full positive difference set.

34 Claims, 8 Drawing Sheets

OTHER PUBLICATIONS

Schneier B: "Applied Cryptography Protocols, Algorithms, and Source Code in C., Passage" Applied Cryptography. Protocols, Algorithms, and Source Code in C, New Your, John Wiley & Sons, US, 1996, p. 197-198, 372-375, 381, XP002463185, Published in New York, NY.

Schneier B Ed—Schneier B: "Applied cryptography. Protocols, Algorithms, and source code in C, Passage" Applied Cryptography. Protocols Algorithms, and Source Code in C New York, John Wiley & Sons, US, pp. 390-391, XP002486015, published 1996, New York, NY.

Clark A et al: "The Lili-II keystream generator" Information Security and Privacy. 7th Australian Conference, ACISP 2002. Proceedings (Lecture Noted in Computer Science vol. 2384) Springer-Verlag Berlin, Germany, 2002, pp. 25-39, XP002486016.

Shi C et al: "A Fast MPEG Video Encryption Algorithm" Proceedings of the ACM Multimedia 98. MM '98. Bristol, Sep. 12-16, 1998, ACM International Mulitmedia Conference, New York, NY : ACM, US, vol. CONF. 6, 1998, pp. 81-88, XP000874756.

International Search Report—PCT/US2007/081737, International Search Authority—European Patent Office—Jul. 18, 2008.

Written Opinion—PCT/US2007/081737, International Search Authority—European Patent Office—Jul. 18, 2008.

\* cited by examiner

METHOD FOR SECURELY EXTENDING KEY STREAM TO ENCRYPT HIGH-ENTROPY DATA

BACKGROUND

1. Field

Various embodiments pertain to digital data compression and particularly to a method for securely extending a key stream to encrypt high-entropy data.

2. Background

There are a number of applications that use very high data throughput and secure encryption. One example is Digital Cinema where a high-value content stream is encrypted at high speeds (e.g., hundreds of megabits per second). The encryption operation is expensive in terms of computation, hardware assistance, and/or processing resources. There are obvious advantages to reducing the operational cost of encryption. Many security implementations either accept the penalty of more expensive encryption or settle for using an inferior (i.e., less secure) encryption algorithm. For example, the expense of encryption can be reduced by computing a weaker encryption key, but this, risks exposes the encrypted information.

Stream cipher implementations are configured to generate a key stream with which a data stream is encrypted (e.g., each data bit is encrypted by a key stream bit). However, due to the hardware and/or processing costs of generating the key stream, the number of bits generated by the key stream during a period of time may be limited to N bits/second (e.g., 10 Kbits/second). Thus, the amount of data that can be securely encrypted in some encryption schemes is limited to N bits/second.

To increase the amount of data that can be encrypted during a period of time, or for other reasons, some applications may compress the data prior to encryption. Even with compression, the length of data to be encrypted in a particular time period may occasionally exceed the length of the key stream that can be generated. For example, time-sensitive applications, such as digital cinema, may generate a key stream at N bits/second (10 Kbits/second) and use it to synchronously encrypt up to N bits/second of compressed data. However, in some instances, the compressed data may exceed N bits/second. That is, the compression algorithm may not be able to compress certain data sufficiently. Since the compressed data length generated during a particular period of time exceeds the key stream length for the same period of time, the data cannot be securely encrypted.

Thus, a way is needed to securely and efficiently encrypt data that is longer than the generated key stream.

SUMMARY

A method is provided for stretching a key stream. A key stream is obtained having a length of $L_Z$ bits, where $L_Z$ is a positive integer. A length $L_D$ corresponding to a data block is also obtained, where $L_D$ is a positive integer, $L_D-L_Z$ new bits are recursively generated by combining at least two bits of the key stream. The $L_D-L_Z$ new bits are then appended to the key stream to generate a stretched key stream. Appending the $L_D-L_Z$ new bits to the key stream may include interleaving the $L_D-L_Z$ new bits into the key stream. The first $L_Z$ bits of the stretched key stream may be copied from the key stream such that $S_i=Z_i$, where $0 \leq i < L_Z$, where Zx represents a bit in the key stream and Sx represents a bit in the stretched key stream.

The data block may be encrypted with the stretched key stream, wherein the data block includes compressed data. Man alternative implementation, the data block may be decrypted with the stretched key stream.

In one example, the key stream of length $L_Z$ is generated such that $L_Z \geq L_D + L_K - H(P)$, where $H(P)$ is an entropy value of the data block, and $L_K$ is the length of an initialization key for generating the key stream. The method may include determining whether length $L_Z$ is greater than length $L_D$.

In one example, generating $L_D-L_Z$ new bits recursively by combining at least two bits of the key stream includes (1) obtaining a first offset O1 such that $0 < O1 < L_Z$; and/or (2) generating the new bits such that a new bit $S_k = Z_i \oplus Z_{(i+O1) \bmod Lz}$, where $L_Z \leq k < 2L_Z$, $0 \leq i < L_Z$, Zx represents a bit in the key stream and Sx represents a bit in the stretched key stream. Additionally, a second offset O2 may be obtained such that $0 < O2 < L_Z$ such that $O1 \neq O2$. The new bits are then generated such that a new bit $S_g = Z_i \oplus Z_{(i+O1) \bmod Lz}$, where $2L_Z \leq g < 3L_Z$, and $0 \leq i < L_Z$. The offsets may be selected such that the first offset O1 and second offset O2 are part of a full positive difference set In another example, generating $L_D-L_Z$ new bits recursively by combining at least two bits of the key stream includes (1) obtaining a first offset O1 and a second offset O2 such that $O1 \neq O2$, $0 < O1 < L_Z$ and $0 < O2 < L_Z$; and/or (2) generating die new bits such that a new bit $S_k = Z_i \oplus Z_{(i+O1) \bmod Lz} \oplus Z_{(i+O2) \bmod Lz}$, where $L_Z \leq k < 2L_Z$, $0 \leq i < L_Z$, Zx represents a bit in the key stream and Sx represents a bit in the stretched key stream. This method may further include (3) obtaining a third offset O3 and a fourth offset O4 such that $O3 \neq O4$, $0 < O3 < L_Z$ and $0 < O4 < L_Z$; and/or (4) generating the new bits such that anew bit $S_g = Z_i \oplus Z_{(i+O2) \bmod Lz} \oplus Z_{(i+O4) \bmod Lz}$, where $2L_Z \leq g < 3L_Z$, and $0 \leq i < L_Z$. The offsets may be selected such that the pair-wise differences between any two offsets are distinct, In yet another example, a plurality of different offsets is obtained between 0 and $L_Z$. The new bits are generated based on one or more bits in the key stream identified by one or more of the plurality of offsets. The new bits are then appended to the key stream.

In another example, generating $L_D-L_Z$ new bits recursively by combining at least two bits of the key stream includes (1) obtaining a first offset O1 and a second offset O2 such that $O1 \neq O2$, $0 < O1 < L_Z$ and $0 < O2 < L_Z$, and/or (2) generating the new bits such that a new bit $S_{k+Lz} = S_k \oplus S_{k+O1} \oplus S_{k+O2}$, where $0 \leq k = L_D - L_Z$, where $L_Z \leq k < 2L_Z$, $0 \leq i < L_Z$, Zx represents a bit in the key stream and Sx represents a bit in the stretched key stream.

In an alternative example, generating $L_D-L_Z$ new bits recursively by combining at least two bits of the key stream includes combining at least two different segments of the key stream to generate multiple new bits in one operation.

A device is also provided comprising (1) a stream cipher generator configured to generate a key stream of length $L_Z$, where $L_Z$ is a positive integer, and/or (2) a stream stretcher coupled to the stream cipher generator. The stream stretcher may be configured to, (a) obtain the key stream, (b) obtain a length $L_D$ corresponding to a data block, where $L_D$ is a positive integer, (c) generate $L_D-L_Z$ new bits recursively by combining at least two bits of the key stream, and/or (d) append the $L_D-L_Z$ new bits to the key stream to generate a stretched key stream.

In one implementation, the device may also include an encryption device configured to receive the stretched key stream and combine it with the data block to encrypt data in the data block. In an alternative implementation the device may include a decryption device configured to receive the stretched key stream and combine it with the data block to decrypt data in the data block The stream cipher generator may generate the key stream of length $L_Z$ such that $L_Z \geq L_D + L_K - H(P)$, where $H(P)$ is an entropy value of the data block, and $L_K$ is the length of an initialization key for the stream cipher generator. The stream stretcher may also be configured to copy the key stream into the stretched key stream such that $S_i = Z_i$, where $0 \leq i < L_Z$, where Zx represents a bit in the key stream and Sx represents a bit in the stretched key stream. In combining at least two bits of the key stream, the stream stretcher may be configured to obtain the at least two bits of the key stream so that their distance to each other are part of a full positive difference set. Additionally, appending the $L_D - L_Z$ new bits to the key stream includes interleaving the $L_D - L_Z$ new bits into the key stream.

In one example, the stream stretcher maybe configured to (a) obtain a first offset O1 such that $0 < O1 < L_Z$; and/or (b) generate the new bits such that a new bit $S_k = Z_i \oplus Z_{(i+O1) \bmod Lz}$, where $L_Z \leq k < 2L_Z$, $0 \leq i < L_Z$, Zx represents a bit in the key stream and Sx represents a bit in the stretched key stream.

In another example, the stream stretcher may be configured to (a) obtain a first offset O1 and a second offset O2 such that $O1 \neq O2$, $0 < O1 < L_Z$ and $0 < O2 < L_Z$; and/or (b) generate the new bits such that a new bit $S_k = Z_i \oplus Z_{(i+O1) \bmod Lz} \oplus Z_{(i+O2) \bmod Lz}$, where $L_Z \leq k < 2L_Z$, $0 \leq i < L_Z$, $Z_x$ represents a bit in the key stream and $S_x$ represents a bit in the stretched key stream.

In yet another example, the stream stretcher may be configured to (a) obtain a first offset O1 and a second offset O2 such that $O1 \neq O2$, $0 < O1 < L_Z$ and $0 < O2 < L_Z$; and/or (b) generate the new bits such that a new bit $S_{k+Lz} = S_k \oplus S_{k+O1} \oplus S_{k+O2}$, where $0 \leq k < L_D - L_Z$, where $L_Z \leq k < 2L_Z$, $0 \leq i < L_Z$, $Z_x$ represents a bit in the key stream and $S_x$ represents a bit in the stretched key stream.

Yet another device is provided comprising: (a) means for obtaining a key stream of length $L_Z$, where $L_Z$ is a positive integer; (b) means for obtaining a length $L_D$ corresponding to a data block, where $L_D$ is a positive integer; (c) means for generating $L_D - L_Z$ new bits recursively by combining at least two bits of the key stream; and/or (d) means for appending the $L_D - L_Z$ new bits to the key stream to generate a stretched key stream. Additionally, the device may include means for encrypting the data block with the stretched key stream. Alternatively, the device may include means for decrypting the data block with the stretched key stream. Length $L_Z$ is such that $L_Z \leq L_D + L_K - H(P)$, where $H(P)$ is an entropy value of the data block, and $L_K$ is the length of an initialization key for generating the key stream.

A machine-readable medium is also provided having one or more instructions for stretching a key stream, which when executed by a processor causes the processor to: (1) obtain the key stream having a length of $L_Z$, (2) obtain a length $L_D$ corresponding to a data block, where $L_D$ is a positive integer, (3) generate $L_D - L_Z$ new bits recursively by combining at least two bits of the key stream, and/or (4) append the $L_D - L_Z$ new bits to die key stream to generate a stretched key stream.

The machine-readable medium may further include one or more instructions which when executed by a processor causes the processor to encrypt or decrypt the data block with the stretched key stream. One or more instructions may also the processor to: (1) obtain a first offset: O1 such that $0 < O1 < L_Z$; (2) generate the new bits such that a new bit $S_k$ is a function of $Z_i$ and $Z_{i+O1}$, where $L_Z \leq k < 1L_Z$, $0 \leq i < L_Z$, Zx represents a bit in the key stream and Sx represents a bit in the stretched key stream; (3) obtain a second offset O2 such that $0 < O2 < L_Z$ and $O1 \neq O2$; and/or (4) generate the new bits such that a new bit $S_k$ is a function of $Z_i$, $Z_{i+O1}$, and $Z_{i+O2}$ where $L_Z \leq k < L_D$, $0 \leq i < L_D$, Zx represents a bit in the key stream and Sx represents a bit in the stretched key stream. The first offset O1 and second offset O2 may be part of a full positive difference set.

A processing device is also provided, comprising a processing circuit configured to (1) obtain the key stream having a length of $L_Z$, (2) obtain a length $L_D$ corresponding to a data block, where $L_D$ is a positive integer, (3) generate $L_D - L_Z$ new bits recursively by combining at least two bits of the key stream, and/or (4) append the $L_D - L_Z$ new bits to the key stream to generate a stretched key stream. The processing circuit may be further configured to obtain one or more offsets used to select the at least two bits of the key stream, the one or more offsets forming a full positive difference set.

The processing circuit may also be further configured to (1) obtain a plurality of different offsets between 0 and $L_Z$, (2) generate other new bits based on one or more bits in the key stream identified by one or more of the plurality of offsets; and/or (3) append the other new bits to the key stream.

DETAILED DESCRIPTION

In the following description, specific details are given to provide a thorough understanding of the embodiments. However, it will be understood by one of ordinary skill in the art that the embodiments may be practiced without these specific details. For example, circuits may not be shown in block diagrams in order not to obscure the embodiments in unnecessary detail.

Also, it is noted that, the embodiments maybe described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

One feature stretches a key stream by inserting or appending bits to the key stream to obtain a key stream sufficiently long to securely encrypt a data stream. This method allows the data to be encrypted by expanding the output of a secure stream cipher.

Another feature provides an algorithm that generates new bits to be inserted into a key stream based certain bits already in the key stream.

In digital cinema, video frames may have a variable length. A frame may be compressed prior to being encrypted, by an encryption key stream for transmission and/or storage. In some instances, the compressed frame may exceed the length of the generated key stream. To securely encrypt the video frame, the key stream is stretched to obtain a cipher block of sufficient length (i.e., at least as long as the compressed video frame).

Figure 1:
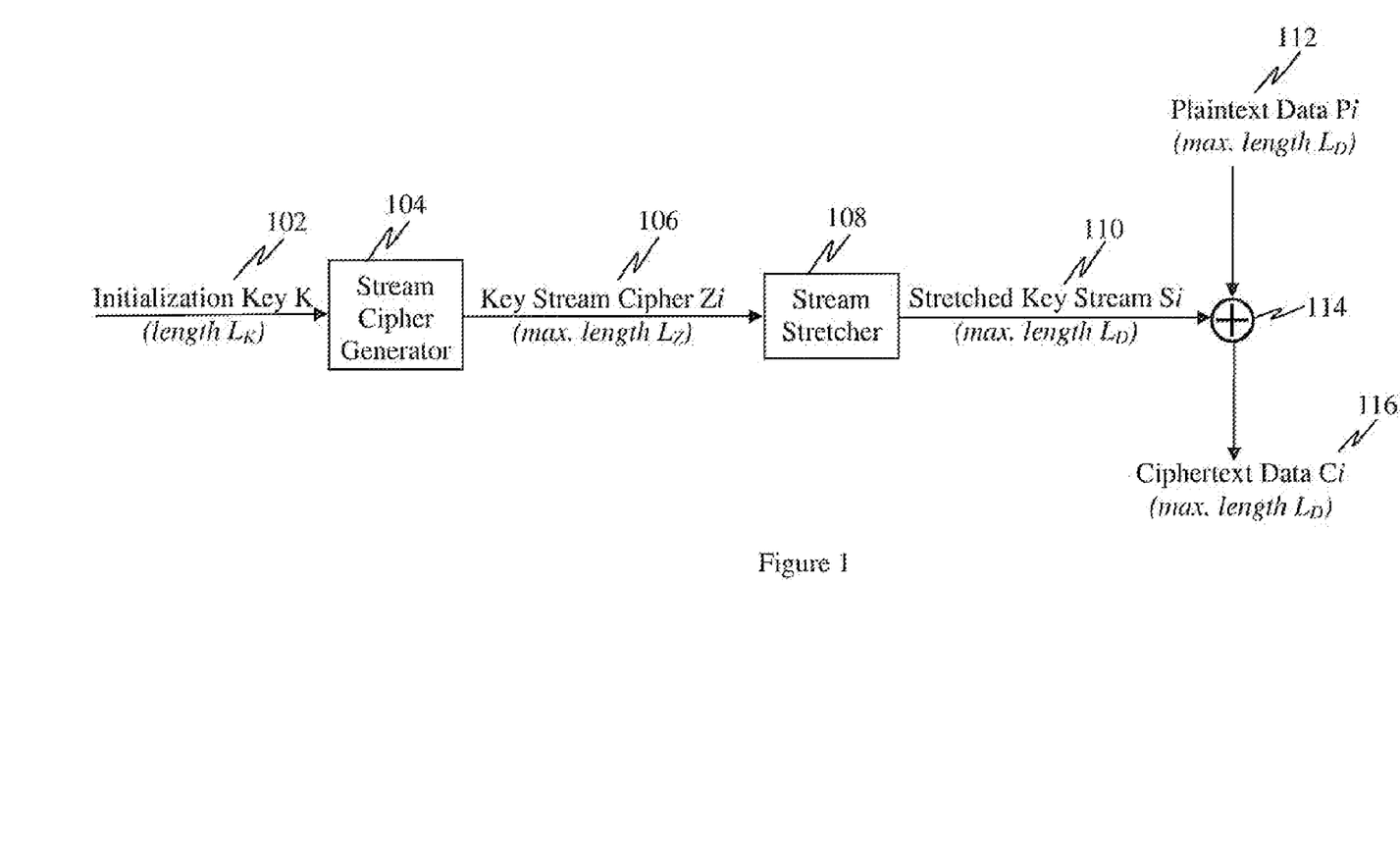
FIG. 1 is a block diagram illustrating one example of how a key stream may be stretched to accommodate a longer data block length.

FIG. 1 is a block diagram illustrating an example of how a key stream may be stretched to accommodate a longer data block length. An initialization key K 102 is fed to a stream cipher generator 104 to generate a computationally secure pseudorandom key stream cipher $Z_i$ 106 at a maximum rate of N bits/second, where M is a positive number. Plaintext data Pi 112 to be encrypted is generated at a greater rate of M bits/second, where M>N. That is, the length $L_D$ of plaintext data Pi 112 is greater than the length $L_Z$ of the generated, key stream cipher Zi 106 for a particular time period. Thus, key stream cipher Zi 106 cannot securely encrypt data Pi 112.

Typically, a data stream to be encrypted is broken into data blocks, each data block being of fixed or Variable length up to $L_D$ bits long. Ideally, a stream cipher is used to generate a key stream having a length of $L_D$ bits (i.e., the key stream cipher is the same length as the data block to be encrypted). Assuming that the stream cipher is secure and has an initialization key K of length $L_K$ knowing some of the bits of the key stream does not reveal any of the other bits. That is, without knowing the initialization key K, the key stream cipher appears to have maximum entropy $L_D$ and appears random, although in reality its entropy is only $L_k$. The most effective way to break this encryption is by brute force attack, i.e., enumerating the possible keys. However, a brute force attack assumes that the data, when decrypted using a trial key, can be recognized as being correct. If the data being decrypted was completely random (in which case the entropy $H(P)=L_D$) the attack will, fail, because it will not be possible to determine just which decryption result is correct. One disadvantage of generating a key stream cipher $L_D$ bits long is that it takes significant processing resources to generate the key stream cipher.

Instead of generating a key stream cipher $L_D$ bits long, one feature provides for generating a key stream cipher 106 $L_Z$ bits long (where $L_Z<L_D$) and then using stream stretcher 108 to expand the key stream cipher $Z_i$ 106 into a stretched key stream $S_i$ 110 $L_D$ bits long. Thus, the stream cipher generator 104 generates a smaller key stream cipher $Z_i$ 106, of length $L_Z$ bits, which is then expanded to generate stretched key stream $S_i$ 110, of length $L_D$ bits, to be used for encryption of plaintext data Pi 112, A characteristic of many applications, such as digital cinema, is that the data to be encrypted is highly compressed, and consequently has a high entropy rate. The high entropy rate of the data allows this method to be secure up to limits determined by the entropy rate and the key length of the stream cipher.

Of course, in practice, even heavily compressed data may still contain redundancy. The redundancy is simply $R=L_D-H(P)$. The amount of entropy left when some of the data is known is often called the equivocation, and is similarly measured in bits. The entropy rate is the ratio of the entropy of the data to the length in bits, that is $H(P)/L_D$.

Thus, stream stretcher 108 is configured to effectively and efficiently mix key stream $Z_i$ 106 bits in generating stretched stream $S_i$ 110. If the mixing and stretching function of stream stretcher 108 is good enough, a high entropy rate in the plaintext data Pi 112 effectively protects the-stretching function used by stream stretcher 108. So long as the combined entropy of the plaintext data Pi 112 and stretched key stream Si 110 is significantly greater than the length $L_D$ of the data block, it will not be possible to break the stretched key stream Si 110 to recover the plaintext data Pi 112. "Significantly greater" means that the combined effective entropy of the stretched key stream Si 110 and the plaintext data Pi 112 should exceed the data block length $L_D$ by at least fee length $L_K$ of the stream cipher's initialization key K 102, then the most effective attack will still be the brute force attack against the stream cipher itself. Restated mathematically, a good stretching function for stream stretcher 108 is secure if:

$$H(P)+L_Z \geq L_D+L_K \quad \text{(Equation 1) or}$$

$$L_Z \geq L_D+L_K-H(P) \quad \text{(Equation 2),}$$

If the entropy rate of the plaintext data Pi 112 is low, an attack may become possible, because relationships (i.e., redundancy) between bits of the plaintext data Pi 112 may reveal bits of the stretched key stream Si 110. That is, a simple relationship between bits in stretched key stream Si 110 would allow recovery of all of the key stream Si 110, and hence of all of the plaintext data Pi 112. Moreover, if the stretching performed by stream stretcher 108 is too simple, it might be possible for some subset of the plaintext data Pi 112 bits to be used to derive some subset of the stretched key stream Si 110 bits, partially breaking the encryption. In the above description, the entropy rate was assumed to be evenly distributed among the bits of the plaintext data block, but in reality this is rarely the case. For example, compression of audio data using discrete cosine transformation leaves some bits, i.e., the most significant bits of the coefficients, relatively more predictable than others.

Stream stretcher 108 takes the key stream cipher Zi 106 and outputs a stretched stream Si 110 of length M, where M is greater than the key stream Zi length N. The stretched key stream Si 110 is then used to encrypt 114 the data Pi 112 by using some simple and reversible operation to generate and output encrypted data Ci 116. For example, a XOR operation may be used to encrypt the plaintext data Pi 112 on a bit-by-bit basis such that ciphertext $C_i$ 116 is generated by $C_i=P_1 \oplus S_i$.

Rather than using an easily decipherable pattern (e.g., 00000 or 0101 or 1111) to pad or stretch the key stream cipher Zi 106, the bits in key stream Zi 106 are combined to generate new bits to stretch the key stream Zi 106 and thereby form stretched key stream Si 110.

In one implementation, the criteria for a good stretching function include: (1) it efficiently utilizes processing resources to stretch the key stream (e.g., the stretching algorithm is relatively fast and utilizing minimal processing resources), and (2) it mixes input bits well (e.g., so that does not allow the plaintext data encrypted therewith to be easily cracked). The stream stretcher 108 may generate a secure stream cipher (e.g., stretched stream cipher Si 110) by using nonlinear operations. However it is quite possible to meet these criteria with only linear operations, thereby avoiding the comparatively processor intensive nonlinear operations. For example, turbo codes or general linear coding (e.g., multiplying the $Z_i$ vector with a binary $L_Z \times L_D$ matrix, where $L_Z$ is the length of the key stream cipher and $L_D$ is the length data stream) chosen to mix input bits well to yield the stretched key stream $S_i$ would be satisfactory solutions.

A more efficient solution is provided In which each bit of stretched key stream Si 110 bits depends on at least two (2) bits of (unstretched) key stream Zi 106, thereby providing good mixing of bits in stretched key stream Si 110. This solution ensures that knowledge of a particular bit of plaintext data Pi 112 does not, by Itself, reveal useful information about other bits of the plaintext data Pi 112, or of stretched key stream Si 110.

In various Implementations, the functions illustrated by the block diagram in FIG. 1 may be implemented in hardware, software, or a combination thereof.

Figure 2:
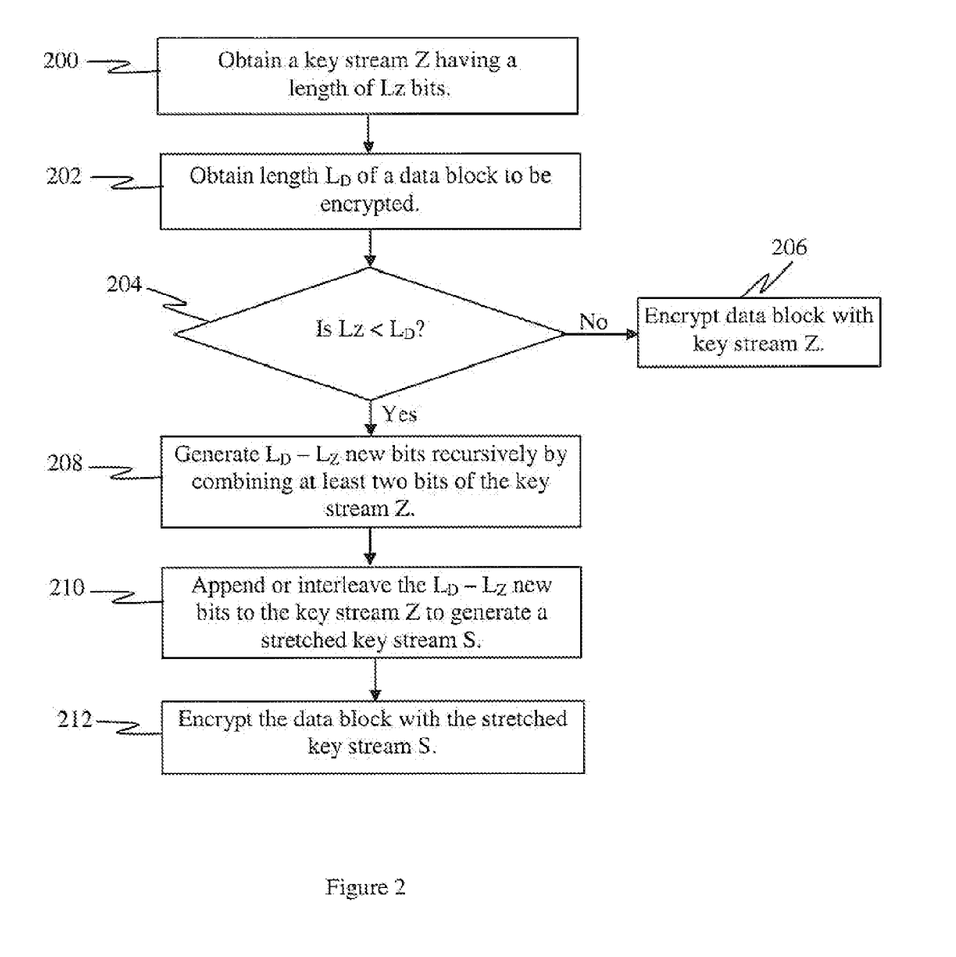
FIG. 2 illustrates an example of a general method for stretching a key stream Z into a stretched key stream S by generating new bits recursively.

FIG. 2 illustrates an example of a general method for stretching a key stream Z into a stretched key stream S by generating new bits recursively. A key stream Z is obtained having a length of $L_Z$ bits 200. This key stream Z may be obtained from a stream cipher that generates $L_Z$ bits within relevant period of time. The length $L_Z$ may be chosen based on an expected amount of entropy in the data to be encrypted so as to guarantee the security of the encrypted data. A length $L_D$ of a data block to be encrypted is also obtained 202. A comparison is made to determine whether $L_Z<L_D$ 204. If $L_Z \geq L_D$, the data block is simply encrypted with key stream Z 206 (e.g., XORing one bit from the data block with a corresponding bit in the key stream Z).

Otherwise, if $L_Z<L_D$, then $L_D-L_Z$ new bits are recursively generated by combining at least two bits Of the key stream Z 208. The $L_D-L_Z$ new bits are appended to or interleaved into the key stream Z to generate a stretched key stream S 210. That is, the new bits maybe (1) appended to the beginning or end of the key stream, (2) inserted, between the beginning and end of the key stream, and/or (3) interleaved evenly or unevenly (e.g., sporadically, randomly, or pseudo-randomly) among the bits of the key stream. "Recursively" means that a new bit is generated based on two or more preceding bits of the key stream Z and/or stretched key stream S. The data block may then be encrypted with the stretched key stream S 212.

This method may also be implemented by obtaining a plurality of different offsets between 0 and $L_Z$. These offsets are associated with particular bits in the key stream. New bits are generated based on one or more of the plurality of offsets. That is, the bits in the key stream associated with the one or more of the plurality of offsets are used to generate the new bits. The new bits are then appended to the key stream.

Figure 3:
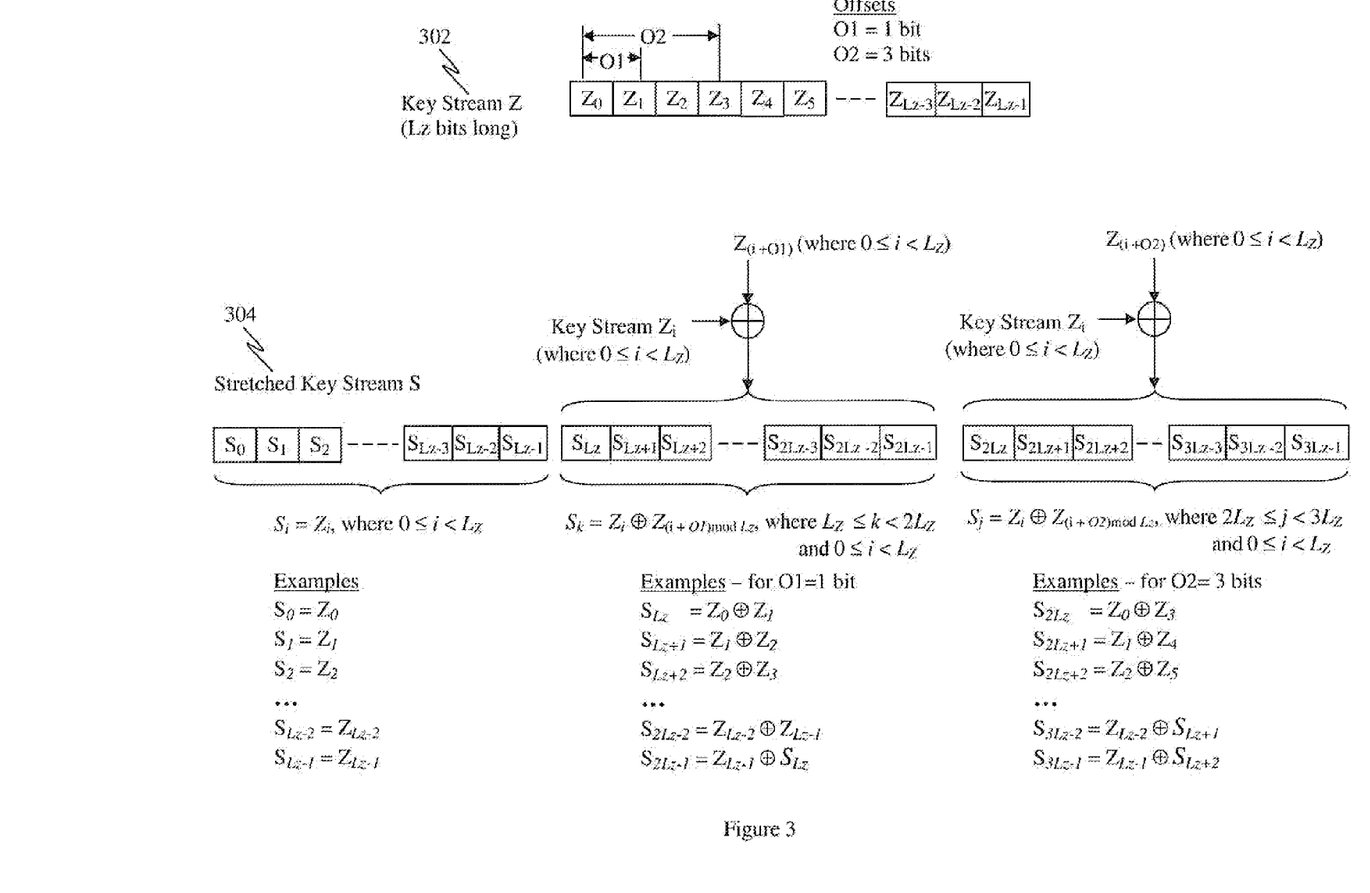
FIG. 3 illustrates an example of a stretching algorithm that implements efficient stream stretching.
Figure 4:
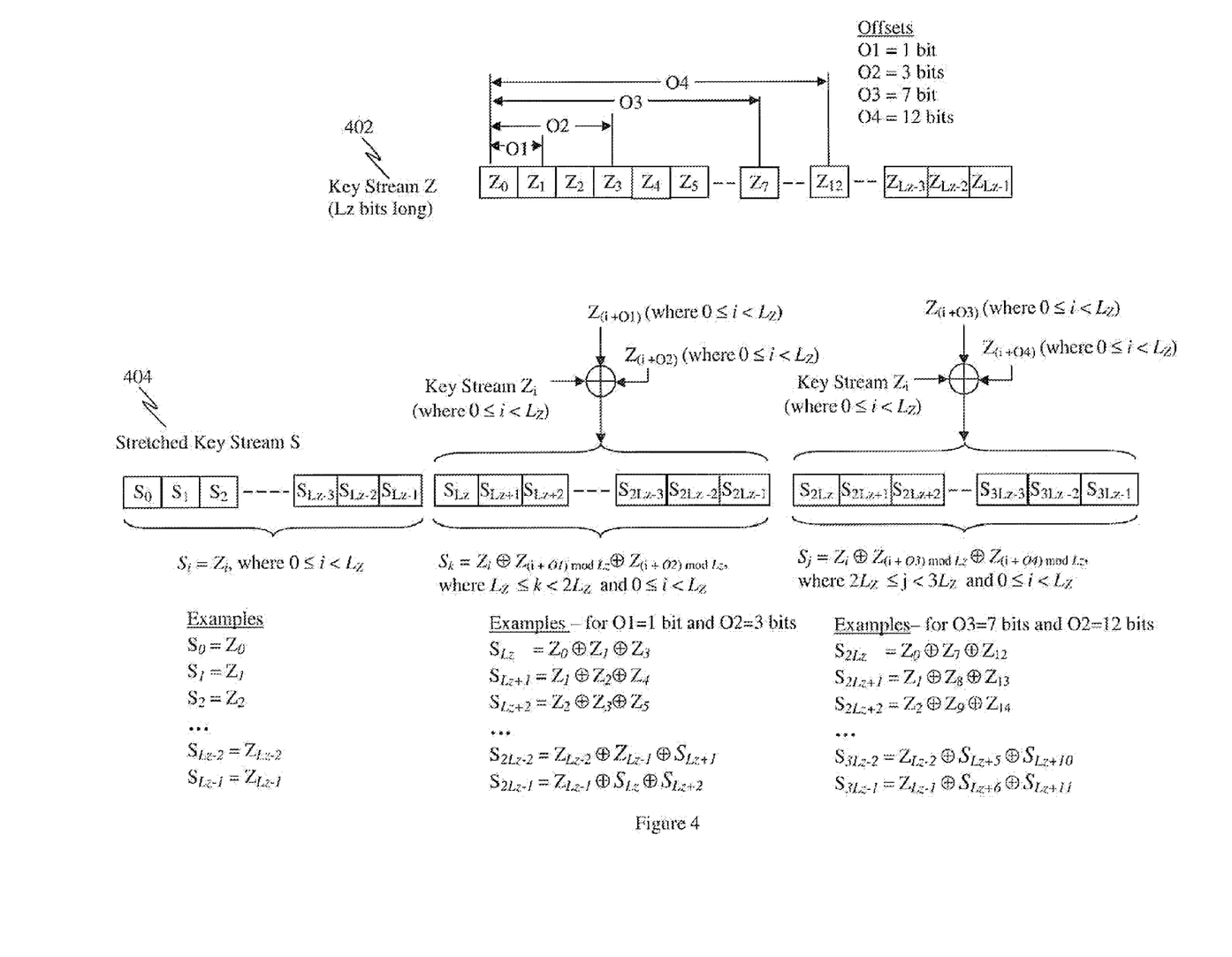
FIG. 4 illustrates an example of a scheme that uses multiple key stream bits to generate a new stretched key stream bit.
Figure 5:
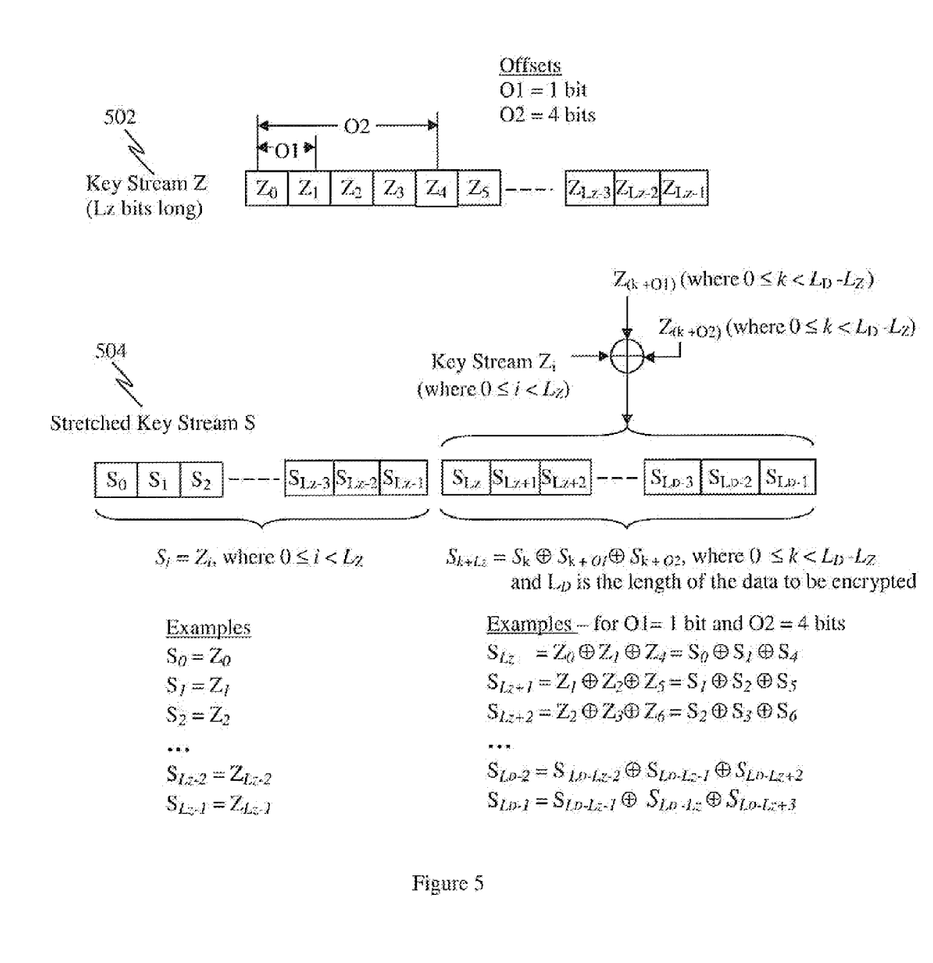
FIG. 5 illustrates yet another example of a scheme for generating new bits to securely stretch a key stream.

FIGS. 3, 4, and 5 illustrate just a few of the ways in which the new bits may be generated to securely stretch a key stream.

FIG. 3 illustrates an example of a stretching algorithm that implements efficient stream stretching. A key stream Z 302 of pseudorandom values is generated. The key stream Z 302 is $L_Z$ bits long for a given time period. The first $L_Z$ bits of stretched key stream Z 304 are copied from key stream S 304 directly (i.e. $S_i=Z_i$, for $0 \leq i<L_Z$).

If more bits are needed to securely encrypt a data stream (e.g., the data stream is $L_D$ bits long, where $L_D>L_Z$), a first offset O1 is selected between two bits (e.g., $Z_0$ and $Z_1$), where $1<O1<L_Z$. Two bits that are offset by O1 bits from each other are combined to generate up to $L_Z$ new bits for stretched key stream S 304. For example, where O1 is selected to be one bit long, a first new bit $S_{L_z}$ is generated by combining key stream bits $Z_0$ and $Z_1$, e.g., by a XOR operation. Similarly, a second new bit $S_{L_z+1}$ is generated by combining key stream bits $Z_1$ and $Z_2$. Thus, for each new bit generated, a different pair of key stream Z 302 bits are used having an offset O1. Thus, new bits are added to stretched key stream S such that $S_k=Z_i \oplus Z_{(i+O1) \bmod L_z}$, where $L_Z \leq k<2L_Z$ and $0 \leq i<L_Z$. Note that if insufficient bits are available in key stream Z to generate new bits for the stretched key stream, one implementation utilizes some of the newly generated bits instead. For example, new stretched key stream bit $S_{2L_z-1}$ may be generated from $Z_{L_z-1}$ and $S_{L_z}$, where $Z_{L_z-1}$ and $S_{L_z}$ are offset by O1 bits and $S_{L_z}$ is a newly generated bit.

If more than an additional $L_Z$ bits are needed, a second offset O2 bits long is selected, where offset O2 is distinct from offset O1. This second offset O2 is used similar to offset O1 to generate tip to $L_Z$ new bits for stretched key stream S. For example, if offset O2 is selected to be five bits, then $S_{2L_z}$ is generated by combining $Z_0$ and $Z_3$ and $S_{2L_z+1}$ is generated by combining $Z_1$ and $Z_4$. Thus, for each new bit generated, a different pair of key stream Z 302 bits is used having an offset O2.

Consequently, the stretched key stream S is represented as $S_i=Z_i$, where $0 \leq i<L_Z$ $S_k=Z_i \oplus Z_{(i+O1) \bmod}$ where $L_Z \leq k<2L_Z$ and $0 \leq i<L_Z$ $S_j=Z_i \oplus Z_{(i+O2) \bmod L_z}$, where $2L_Z \leq j<3L_Z$ and $0 \leq i<L_Z$.

New bits are added to stretched key stream S until the stretched key stream S is $L_D$ bits long (i.e., the length of the data stream to be encrypted). If additional bits needed, then additional offsets $O_i$ are selected with which to generate new bits to add to stretched key stream S.

As an example of the adequacy of such key stream stretching, consider a data block P having length $L_D$, $800 \leq L_D \leq 1200$ bits, and an entropy rate of 80%. A key stream cipher Z has an initialization key K of length $L_K=128$ bits. Assume the largest possible input data block Is $L_D=1200$ bits long and a data block entropy $H(P)=75\%$ for safety since the entropy rate is not actually constant over varying data. Thus, entropy $H(P)=0.75 \times 1200$ bits=900 bits. Using Equation 2 above, the adequate key stream cipher length $L_Z$ is given as $L_Z \geq L_D+L_K-H(P)$. Thus, key stream length $L_Z \geq 1200+128-900=428$ bits. Thus, in this example, a key stream cipher of length $L_Z=428$ bits would ensure that security of the encrypted data block P. Assuming that the key stretching operation is significantly faster than the stream cipher generator (e.g., key stream generator), an efficiency gain of approximately 50% is achieved. That is, by taking into account the entropy $H(P)$ of the data block, a shorter length $L_Z$ key stream cipher may be generated and subsequently stretched to a data block length $L_D$.

Now, consider a scenario where $L_D=500$, $O_1=1$, and $O_2=2$. The stretched key stream bits $S_i$, where $i \in \{0, 1, 2, 500, 501, 1000\}$, all depend only on the first three bits (i.e., $S_0$, $S_1$, $S_2$) of the stream key Z. Thus, knowing any three of the corresponding plaintext bits would reveals all three of the others. This is because, in this example, offset $O_2$ is a small multiple of offset $O_1$.

One solution to this problem is to select offsets O that are distinct and each offset O generates the group modulo $L_Z$ under addition (otherwise the bits can be separated into independent equivalence classes, which might lead to a divide-and-conquer attack). That is, the offsets O are selected so that they form a Full Positive Difference Set or Golomb Ruler. That is, that the pair-wise differences between any two offsets (counting 0 as offset $O_0$) are all distinct. The offsets O ate selected such that no two pairs of offsets are the same distance apart. The largest distance between two offsets is its length.

However, this offset selection scheme still has some weaknesses in that once a few bits become known, each bit that subsequently becomes, known and Is related to a bit already known allows yet another bit to be derived (i.e., become known). The reason for this weakness is that only two bits of the key stream are used to derive anew bit.

FIG. 4 illustrates an example of a scheme that uses multiple key stream bits to generate a new stretched key stream bit. Since the operation of combining bits is so simple (i.e., it takes few processing resources), more than just two bits may be combined to generate new bits. For example, three* four, five, or more key stream bits may be combined to generate new bits for the stretched key stream.

A key stream Z 402 $L_Z$ bits long is generated. The first $L_Z$ bits of key stream S 402 are copied as the first $L_Z$ bits of stretched key streams 404. A pair of offsets O1 and O2 is selected with which to generate up to $L_Z$ new bits according to $S_i = Z_i \oplus Z_{(i+O1) \bmod Lz} \oplus Z_{(i+O2) \bmod Lz}$, where $L_Z \leq i < 2L_Z$. For example, for offset O1=1 and O2=3, bit $S_{Lz} = Z_0 \oplus Z_1 \oplus Z_3$ and bit $S_{Lz+1} = Z_1 \oplus Z_2 \alpha Z_4$. Similarly, if an additional $L_Z$ bits are needed, they may be generated based oil a second pair of offsets O3 and O4 such that new bit $S_i = Z_i \oplus Z_{(i+O3) \bmod Lz} \oplus Z_{(i+O4) \bmod Lz}$, where $2L_Z \leq i < 3L_Z$. For example, for offset O3=7 and O4=12, bit $S_{2Lz} = Z_0 \oplus Z_{12}$ and $S_{2Lz+1} = Z_1 \oplus Z_8 \oplus Z_{13}$.

Consequently, the stretched key stream S is represented as:

$S_i = Z_i$, where $0 \leq i < L_Z$ $S_k = Z_i \oplus Z_{(i+O1) \bmod Lz} \oplus Z_{(i+O2) \bmod Lz}$, where $L_Z \leq k < 2L_Z$ and $0 \leq i \leq L_Z$ $S_j = Z_i \oplus Z_{(i+O3) \bmod Lz} \oplus Z_{(i+O4) \bmod Lz}$, where $2L_Z \leq j \leq 3L_Z$ As before, each of the offsets $O_i$ are distinct values modulo $L_z$, and form a Full Positive Difference Set, New bits are added to stretched key stream S until the stretched key stream S is $L_D$ bits long (i.e., the length of the data stream to be encrypted). If additional bits are needed, then additional offsets $O_i$ are selected with which to generate new bits to add to stretched key stream S.

In one implementation, key stream length $L_Z$ to be chosen to be a prime number. For the example discussed in FIG. 3, $L_Z$ may be chosen to be 431 for this reason. Then all non-zero offsets are generators. In fact, when more than two bits are combined in each step, only one of them needs to be a generator.

FIG. 5 illustrates yet another example of a scheme for generating new bits to securely stretch a key stream. One aspect of this method is to generate stretched key stream S 504 having bits that are as good as the key stream Z bits. That is, the stretched key stream S bits should appear as random as the (cipher) key stream Z bits. To generate new bits, one Implementation simply uses the S bits when the Z bits run out, using offsets O1 and O2 in a kind of recurrence relation. The first $L_Z$ bits of (cipher) key stream Z 502 are merely copied into stretched key stream S 504 such that $S_i = Z_i$, where $0 \leq i < L_Z$. If additional bits are needed, at least two offsets O1 and O2 are selected from a Full Positive Difference Set. New bits are then generated based on offsets O1 and O2 such that $S_{i+Lz} = S_i \oplus S_{i+O1} \oplus S_{i+O2}$, where $0 \leq i < L_D - L_Z$. For example, for O1=1 bit and O2=4 bits, $S_{Lz} = Z_0 \oplus Z_1 \oplus Z_4 = S_0 \oplus S_1 \oplus S_4$ and $S_{Lz+1} = Z_i \oplus Z_2 \oplus Z_5 = S_1 \oplus S_2 \oplus S_5$. Consequently, the stretched key stream S may be represented as $S_i = Z_i$, where $0 \leq i < L_Z$ $S_{k+Lz} = S_k \oplus S_{k+O1} \oplus S_{k+O2}$, where $0 \leq k < L_D - L_Z$ Computationally, this means the stretched key stream S 504 may be calculated on a single pass with information calculated from its previously existing or generated S bits based on the same offsets O1 and O2.

Figure 6:
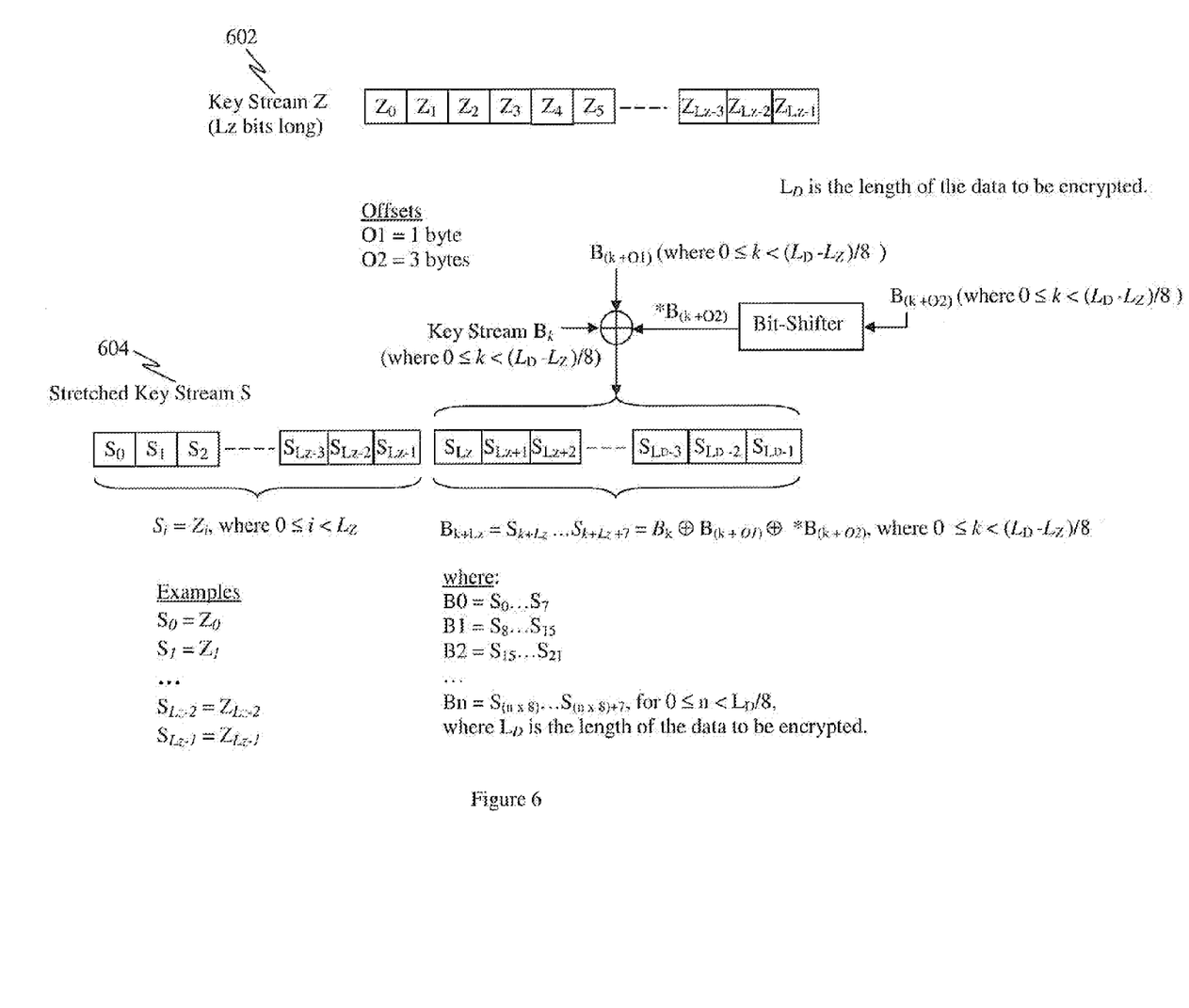
FIG. 6 illustrates an example of a scheme for stretching a key stream on a byte basis.

FIG. 6 illustrates an example of a scheme for stretching a key stream on a byte basis. Most computers operate naturally on data organized as bytes or words. Instead of the recurrence being done on individual bits (e.g., as illustrated in FIGS. 3, 4, and/or 5), it may be done on bytes or words. In this implementation, a key stream cipher Z 602, $L_Z$ bits long, is generated. The $L_Z$ bits are copied into stretched key stream 604 so that Si=Zi for $0 \leq i < L_Z$. Then additional bits are added on either on a word-by-word basis or a byte-by-byte basis so that a plaintext data blocks $L_D$ bits long, can be encrypted by the stretched key stream 604. For example, using offsets O1=1 byte and O2=3 bytes, a new byte may generated and added to stretched key stream S 604 by combining its bytes $B_k$, $B_{(k+O1)}$, and a bit-shifted version of $B_{(k+O2)}$, where $0 \leq k < (L_D - L_Z)/8$.

Using bytes instead of bits would violate the condition that die offsets O be generators because, viewed on a bit level, the offsets would all be evenly divided by the word size. Care could be used to ensure no bad interaction between the bytes of the key stream and the bytes of the plaintext (e.g., if coefficients of a discrete cosine transform data were also of the byte size). This could be addressed in a number of ways. For example, one or more bytes or words of the recurrence relationship may be rotated, as illustrated by the bit rotation of $B_{(k+O2)}$ to obtain a rotated byte * $B_{(k+O2)}$, to destroy such alignment. Alternatively, bit offsets may be used (instead of byte offsets O1 and O2) that were not whole byte offsets. Another option is to use bit shifting to combine two bytes or words but still utilizing the byte-parallel or word-parallel computation.

While the example in FIG. 6 uses 8-bit bytes as the computational unit, other segment sizes may be used in various implementations. In this example, that $L_Z$ and $L_D$ have been rounded up to be multiples of eight (8).

In various Implementations, part or all of the stretching schemes illustrated in FIGS. 3, 4, 5 and/or 6 may be Implemented In hardware, software, or a combination thereof.

Note that while simple XOR operations have been used in illustrating various examples of key stream stretching, other operations/functions may be used. It Is not necessary that the recurrence function (e,g., stretching algorithm implemented by key stream stretcher 108) actually be linear, merely that it should not introduce any bias. An example of a nonlinear function that could be used by the stream stretcher is the boolean Majority Function, which has three inputs and produces as its output the value which appeared most in its inputs. This can be represented more simply as maj(a,b,c)=ab ⊕ bc ⊕ ca.

It is also possible to use a block cipher such as AES or Triple-DES in a mode that makes it effectively a stream cipher. Counter Mode and Output Feedback Mode are two such modes. Digital Cinema, for example, uses Interleaved Output Feedback Mode. These modes are all described in National Institute of Standards and Technology—Special Publication 800-20, "Modes of Operation Validation System for the Triple Data Encryption Algorithm (TMOVS): Requirements and Procedures," revised April 2000. The present stretching schemes may be Implemented with these and other cipher modes.

Figure 7:
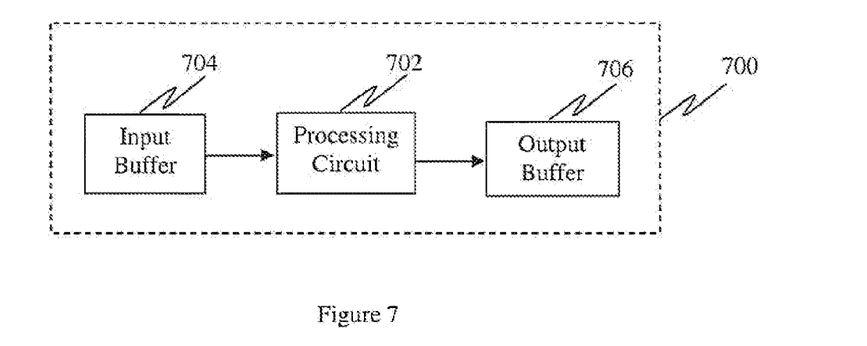
FIG. 7 illustrates an example of a processing device configured to implement a key stream stretching function.

FIG. 7 illustrates an example of a processing device 700 configured to implement a key stream stretching function. A processing circuit 702 may generate a stream cipher Z using a secure algorithm. The length of the stream cipher may be dependent on the amount of entropy expected in data to be encrypted. That is, based on the entropy of the data to be encrypted, the length $L_Z$ of key stream cipher Z may be just long enough to ensure the security of the encrypted data. Because the data to be encrypted may contain significant entropy, the length $L_Z$ may be significantly less than the length $L_D$ of the data to be encrypted. Processing circuit 702 obtains the data length $L_D$ and, if necessary, adds new bits to the key stream cipher Z so it is extended or stretched to at least $L_D$ bits long. The new bits may be added by combining at least two bits in stream cipher Z in a recursive manner. For example, two or more bits may be XORed to generate a new bit. The two or more bits may be offset from each other as exemplified in the schemes of FIGS. 3, 4, 5, and/or 6. Processing circuit 702 then obtains the data to be encrypted from input buffer 704, encrypts the data using the stretched stream cipher Z, and outputs the encrypted data to output buffer 706.

In various implementations, the processing device 700 may be a computer, microprocessor, programmable logic device, and/or digital circuits.

Figure 8:
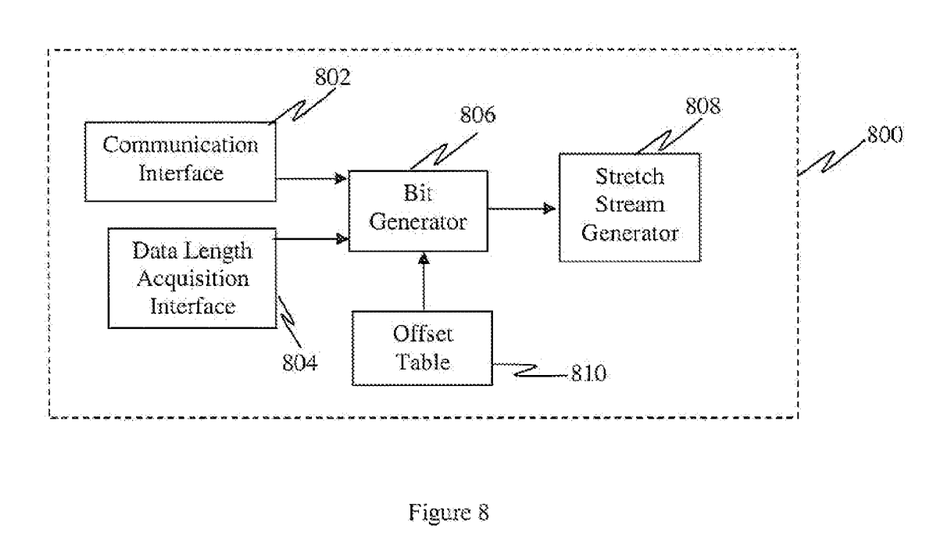
FIG. 8 illustrates one example of a key stream stretching device.

FIG. 8 illustrates an example of a key stream stretching device 800 including a communication interface 802 for obtaining a key stream of length $L_Z$, a data length acquisition interface 804 for obtaining the length $L_D$ of a data block, a bit generator 806 for generating $L_D$-$L_Z$ new bits recursively by combining at least two bits of the key stream, and stream generator 808 for appending the $L_D$-$L_Z$ new bits to the key stream, to generate a stretched key stream. Additionally, an offset table 810 includes one or more offsets that are used by the bit generator 806 to select the at least two bits of the key stream. In one example, the one or more offsets form a full positive difference set. The new bits may be (1) appended to the beginning or end of the key stream, (2) inserted between the beginning and end or the key stream, and/or (3) interleaved evenly or unevenly (e.g., sporadically, randomly, or pseudo-randomly) among the bits of the key stream Consequently, a device is provided, comprising (a) means for obtaining a key stream of length $L_Z$, where $L_Z$ is a positive integer, (b) means for obtaining a length $L_D$ corresponding to a data block, where $L_D$ is a positive integer, (c) means for generating $L_D$-$L_Z$ new bits recursively by combining at least two bits of the key stream, and (d) means for appending the $L_D$-$L_Z$ new bits to the key stream to generate a stretched key stream.

Figure 9:
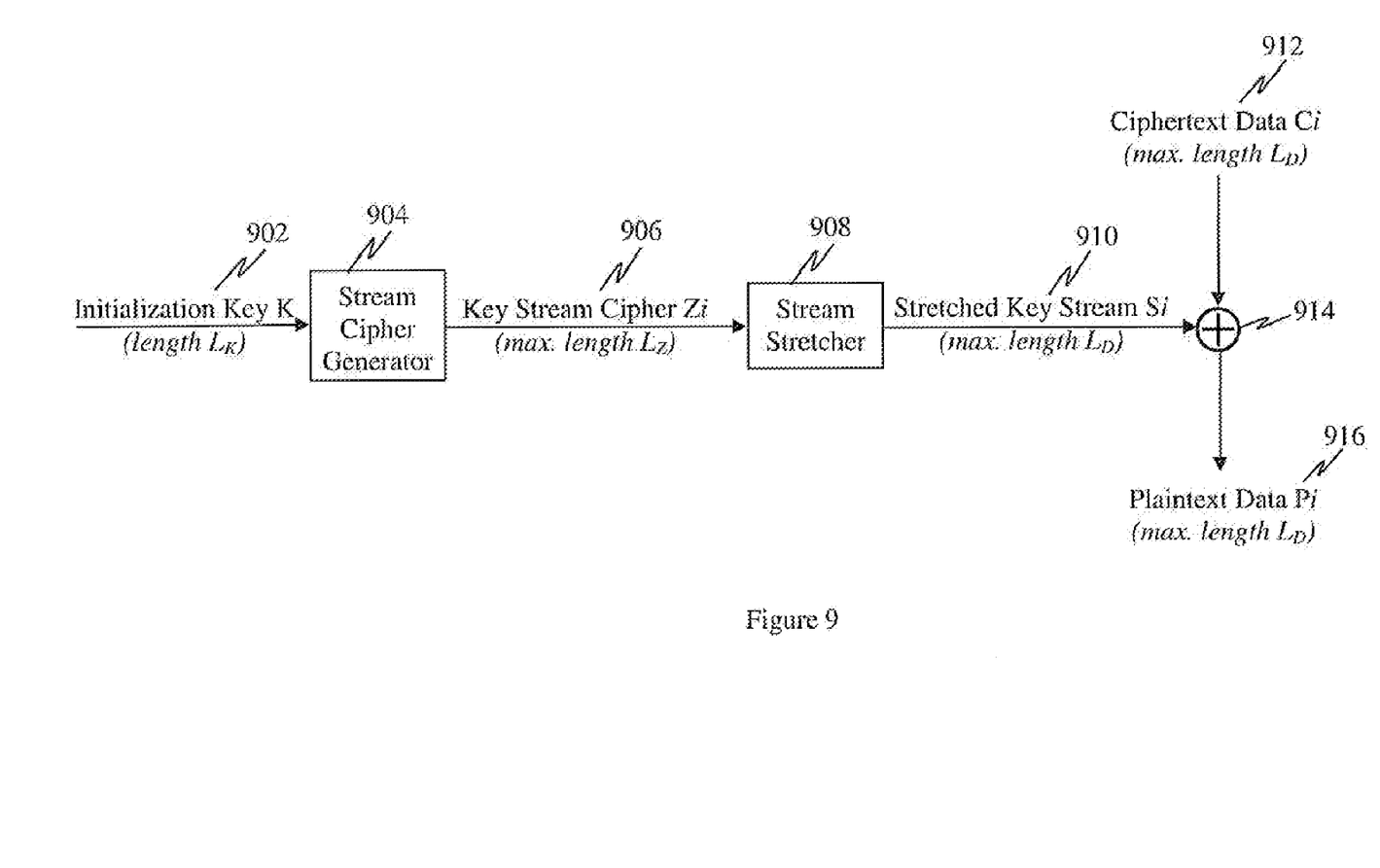
FIG. 9 is a block diagram illustrating an example of a method and/or device for decrypting an encrypted data stream using a stretched stream cipher.

FIG. 9 is a block diagram illustrating an example of a method and/or device for decrypting an encrypted data stream using a stretched stream cipher. This method and/of device decrypts data that has been encrypted using a key stream stretching function as illustrated in FIGS. 1-6. An Initialization key K 902 is fed into a stream cipher generator 904 to generate a key stream Zi 906, having a length of $L_Z$ bits. A stream stretcher 908 then uses the bits in key stream Zi 906 to generate new bits and obtain stretched key stream Si 910. For example, stream stretcher 908 may be configured to stretch key stream Zi 906 as illustrated in FIGS. 3, 4, 5, or 6 to obtain stretched key stream 910. The stretched key stream 910 is then combined 914 with an encrypted data Ci 912 to obtain plaintext data 916.

One or more of the steps and functions illustrated in FIGS. 1, 2, 3, 4, 5, 6, 7, 8, and/or 9 may be rearranged and/or combined into a single step or embodied in several steps without departing from the invention. Additional components and/or steps may also be added without departing from the invention. The apparatus, devices, and/or components illustrated in FIGS. 1, 7, 8 and/or 9 may be configured to perform the methods, features, or steps illustrated in FIGS. 2, 3, 4, 5, and/or 6.

The foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for stretching a key stream, comprising:
obtaining a key stream having a length of $L_Z$ bits by a hardware stream stretcher, where $L_Z$ is a positive integer;
obtaining a length $L_D$ corresponding to a data block by the hardware stream stretcher, where $L_D$ is a positive integer and $L_D > L_Z$;
generating $L_D$-$L_Z$ new bits recursively by combining at least two bits of the key stream by the hardware stream stretcher;
appending the $L_D$-$L_Z$ new bits to the key stream by the hardware stream stretcher to generate a stretched key stream; and
encrypting the data block with the stretched key stream,
wherein generating $L_D$-$L_Z$ new bits recursively by combining at least two bits of the key stream includes
obtaining a first offset O1 such that $0 < O1 < L_Z$; and
generating the new bits such that a new bit $S_k = Z_i \oplus Z_{(i+O1) \bmod L_Z}$, where $L_Z \leq k < 2L_Z$, $0 \leq i < L_Z$, $Z_i$ represents a bit in the key stream and $S_k$ represents a bit in the stretched key stream.

2. The method of claim 1 wherein the data block includes compressed data.

3. The method of claim 1 wherein appending the $L_D$-$L_Z$ new bits to the key stream includes interleaving the $L_D$-$L_Z$ new bits into the key stream.

4. The method of claim 1 further comprising:
repeating the obtaining, generating, and appending functions with another data block to generate another stretched key stream; and
decrypting another data block with the another stretched key stream.

5. The method of claim 1 further comprising:
generating the key stream of length $L_Z$ such that $L_Z \geq L_D + L_K - H(P)$, where $H(P)$ is an entropy value of the data block, and $L_K$ is the length of an initialization key for generating the key stream.

6. The method of claim 1 further comprising:
determining whether length $L_Z$ is greater than length $L_D$.

7. The method of claim 1 wherein the first $L_Z$ bits of the stretched key stream are copied from the key stream such that $S_i=Z_i$, where $0 \leq i < L_Z$, where $Z_i$ represents a bit in the key stream and $S_i$ represents a bit in the stretched key stream.

8. The method of claim 1 further comprising:
   obtaining a second offset O2 such that $0 < O2 < L_Z$ such that $O1 \neq O2$; and
   generating the new bits such that a new bit $S_g = Z_i \oplus Z_{(i+O1) \bmod Lz}$, where $2L_Z \leq g < 3L_Z$, and $0 \leq i < L_Z$.

9. The method of claim 8 wherein the offsets are selected such that the first offset O1 and second offset O2 are part of a full positive difference set.

10. The method of claim 1 wherein generating $L_D - L_Z$ new bits recursively by combining at least two bits of the key stream includes
    obtaining the first offset O1 and a second offset O2 such that $O1 \neq O2$, $0 < O1 < L_Z$ and $0 < O2 < L_Z$; and
    generating the new bits such that a new bit $S_k = Z_i \oplus Z_{(i+O1) \bmod Lz} \oplus Z_{(i+O2) \bmod Lz}$, where $L_Z \leq k < 2L_Z$, $0 \leq i < L_Z$, $Z_i$ represents a bit in the key stream and $S_k$ represents a bit in the stretched key stream.

11. The method of claim 10 further comprising:
    obtaining a third offset O3 and a fourth offset O4 such that $O3 \neq O4$, $0 < O3 < L_Z$ and $0 < O4 < L_Z$; and
    generating the new bits such that a new bit $S_g = Z_i \oplus Z_{(i+O2) \bmod Lz} \oplus Z_{(i+O4) \bmod Lz}$, where $2L_Z \leq g < 3L_Z$, and $0 \leq i < L_Z$.

12. The method of claim 11 wherein the offsets are selected such that the pair-wise differences between any two offsets are distinct.

13. The method of claim 10 further comprising
    obtaining a plurality of different offsets between 0 and $L_Z$; and
    generating other new bits based on one or more bits in the key stream identified by one or more of the plurality of offsets; and
    appending the other new bits to the key stream.

14. The method claim 1 wherein generating $L_D - L_Z$ new bits recursively by combining at least two bits of the key stream includes
    obtaining the first offset O1 and a second offset O2 such that $O1 \neq O2$, $0 < O1 < L_Z$ and $0 < O2 < L_Z$; and
    generating the new bits such that a new bit $S_{k+Lz} = S_k \oplus S_{k+O1} \oplus S_{k+O2}$, where $0 \leq k < L_D - L_Z$, where $L_Z \leq k < 2L_Z$, $0 \leq i < L_Z$, and $S_{k+Lz}$ represents a bit in the stretched key stream.

15. The method of claim 1 wherein generating $L_D - L_Z$ new bits recursively by combining at least two bits of the key stream includes
    combining at least two different segments of the key stream to generate multiple new bits in one operation.

16. A hardware device comprising:
    a hardware stream cipher generator configured to generate a key stream of length $L_Z$, where $L_Z$ is a positive integer; and
    a hardware stream stretcher coupled to the stream cipher generator, the stream stretcher configured to obtain the key stream,
    obtain a length $L_D$ corresponding to a data block, where $L_D$ is a positive integer and $L_D > L_Z$,
    generate $L_D - L_Z$ new bits recursively by combining at least two bits of the key stream, append the $L_D - L_Z$ new bits to the key stream to generate a stretched key stream, and
    an encryption device configured to receive the stretched key stream and combine it with the data block to encrypt data in the data block, wherein the hardware stream stretcher is further configured to obtain a first offset O1 such that $0 < O1 < L_Z$; and
    generate the new bits such that a new bit $S_k = Z_{i \oplus Z(i+O1) \bmod Lz}$, where $L_Z \leq k < 2L_Z$, $0 \leq i < L_Z$, $Z_i$ represents a bit in the key stream and $S_k$ represents a bit in the stretched key stream.

17. The device of claim 16 further comprising:
    a decryption device configured to receive the stretched key stream and combine it with the data block to decrypt data in the data block.

18. The device of claim 16 wherein the stream cipher generator generates the key stream of length $L_Z$ such that $L_Z \geq L_D + L_K - H(P)$, where $H(P)$ is an entropy value of the data block, and $L_K$ is the length of an initialization key for the stream cipher generator.

19. The device of claim 16 wherein the stream stretcher is configured to
    copy the key stream into the stretched key stream such that $S_i = Z_i$, where $0 \leq i < L_Z$, where $Z_i$, represents a bit in the key stream and $S_i$, represents a bit in the stretched key stream.

20. The device of claim 16 wherein the stream stretcher is configured to
    obtain a first offset O1 and a second offset O2 such that $O1 \neq O2$, $0 < O1 < L_Z$ and $0 < O2 < L_Z$; and
    generate the new bits such that a new bit $S_k = Z_i \oplus Z_{(i+O1) \bmod Lz} \oplus Z_{(i+O2) \bmod Lz}$, where $L_Z \leq k < 2L_Z$, $0 \leq i < L_Z$, $Z_i$ represents a bit in the key stream and $S_k$ represents a bit in the stretched key stream.

21. The device of claim 16 wherein the stream stretcher is configured to
    obtain a first offset O1 and a second offset O2 such that $O1 \neq O2$, $0 < O1 < L_Z$ and $0 < O2 < L_Z$; and
    generate the new bits such that a new bit $S_{k+Lz} = S_k \oplus S_{k+O1} \oplus S_{k+O2}$, where $0 \leq k < L_D - L_Z$, where $L_Z \leq k < 2L_Z$, $0 \leq i < L_Z$, and $S_{k+Lz}$ represents a bit in the stretched key stream.

22. The device of claim 16 wherein combining at least two bits of the key stream, the stream stretcher is configured to
    obtain the at least two bits of the key stream so that their distance to each other are part of a full positive difference set.

23. The device of claim 16 wherein appending the $L_D - L_Z$ new bits to the key stream includes interleaving the $L_D - L_Z$ new bits into the key stream.

24. A hardware device comprising:
    hardware means for obtaining a key stream of length $L_Z$, where $L_Z$ is a positive integer;
    hardware means for obtaining a length $L_D$ corresponding to a data block, where $L_D$ is a positive integer and $L_D > L_Z$;
    hardware means for generating $L_D - L_Z$ new bits recursively by combining at least two bits of the key stream;
    hardware means for appending the $L_D - L_Z$ new bits to the key stream to generate a stretched key stream; and
    means for encrypting the data block with the stretched key stream, wherein
    the hardware means for generating $L_D - L_Z$ new bits recursively by combining at least two bits of the key stream includes:
    hardware means for obtaining a first offset O1 such that $0 < O1 < L_Z$; and
    hardware means for generating the new bits such that a new bit $S_k = Z_i \oplus Z_{(i+O1) \bmod Lz}$, where $L_Z \leq k < 2L_Z$, $0 \leq i < L_Z$, $Z_i$ represents a bit in the key stream and $S_k$ represents a bit in the stretched key stream.

25. The device of claim 24 further comprising:
    means for decrypting the data block with the stretched key stream.

26. The device of claim 24 wherein length $L_Z \geq L_D + L_K - H(P)$, where $H(P)$ is an entropy value of the data block, and $L_K$ is the length of an initialization key for generating the key stream.

27. The device of claim 24 further comprising:
means for obtaining the at least two bits of the key stream so that their distance to each other is part of a full positive difference set.

28. A non-transitory machine-readable medium having tangibly stored thereon one or more instructions for stretching a key stream, which when executed by a processor causes the processor to:
obtain the key stream having a length of $L_Z$,
obtain a length $L_D$ corresponding to a data block, where $L_D$ is a positive integer,
generate $L_D - L_Z$ new bits recursively by combining at least two bits of the key stream,
append the $L_D - L_Z$ new bits to the key stream to generate a stretched key stream, and
encrypt the data block with the stretched key stream, the medium further having having tangibly stored thereon one or more instructions which when executed by the processor causes the processor to:
obtain a first offset O1 such that $0 < O1 < L_Z$; and
generate the new bits such that a new bit $S_k$ is a function of $Z_i$ and $Z_{i+O1}$, where $L_Z \leq k < 2L_Z$, $0 \leq i < L_Z$, $Z_i$ represents a bit in the key stream and $S_k$ represents a bit in the stretched key stream.

29. The non-transitory machine-readable medium of claim 28 further having tangibly stored thereon one or more instructions which when executed by a processor causes the processor to:
decrypt the data block with the stretched key stream.

30. The non-transitory machine-readable medium of claim 28 further having tangibly stored thereon one or more instructions which when executed by the processor causes the processor to:
obtain a second offset O2 such that $0 < O2 < L_Z$ and $O1 \neq O2$; and
generate the new bits such that a new bit $S_k$ is a function of $Z_i$, $Z_{i+O1}$, and $Z_{i+O2}$ where $L_Z \leq k < L_D$, $0 \leq i < L_D$, $Z_i$ represents a bit in the key stream and $S_k$ represents a bit in the stretched key stream.

31. The non-transitory machine-readable medium of claim 30 wherein the first offset O1 and second offset O2 are part of a full positive difference set.

32. A hardware processing device comprising
a hardware processing circuit configured to obtain the key stream having a length of $L_Z$,
obtain a length $L_D$ corresponding to a data block, where $L_D$ is a positive integer and $L_D > L_Z$,
generate $L_D - L_Z$ new bits recursively by combining at least two bits of the key stream, append the $L_D - L_Z$ new bits to the key stream to generate a stretched key stream, and encrypt the data block with the stretched key stream, wherein the hardware processing circuit is further configured to obtain a first offset O1 such that $0 < O1 < L_Z$; and
generate the new bits such that a new bit $S_k = Z_i \oplus Z_{(i+O1) \bmod L_Z}$, where $L_Z \leq k < 2L_Z$, $0 \leq i < L_Z$, $Z_i$ represents a bit in the key stream and $S_k$ represents a bit in the stretched key stream.

33. The processing device of claim 32 wherein the processing circuit is further configured to
obtain one or more offsets used to select the at least two bits of the key stream, the one or more offsets forming a full positive difference set.

34. The processing device of claim 32 wherein the processing circuit is further configured to
obtain a plurality of different offsets between 0 and $L_Z$;
generate other new bits based on one or more bits in the key stream identified by one or more of the plurality of offsets; and
append the other new bits to the key stream.

* * * * *